United States Patent [19]

Sauber

[11] 4,073,454
[45] Feb. 14, 1978

[54] OUTRIGGER PAD

[76] Inventor: Charles J. Sauber, 10 N. Sauber Road, Virgil, Ill. 60182

[21] Appl. No.: 708,408

[22] Filed: July 26, 1976

[51] Int. Cl.$^2$ .......................................... F16M 11/24
[52] U.S. Cl. .............................. 248/188.2; 248/188.8; 280/763
[58] Field of Search .............. 46/25; 248/188.2, 188.8, 248/188.9, 357; 254/DIG. 1, DIG. 4, 101; 280/763–766

[56] References Cited

U.S. PATENT DOCUMENTS

| | | | |
|---|---|---|---|
| 1,065,060 | 6/1913 | Leyner | 254/101 |
| 1,879,030 | 9/1932 | Bayles | 254/101 X |
| 3,021,638 | 2/1962 | Kristek | 248/188.2 |
| 3,030,730 | 4/1962 | Costar | 248/188.2 |
| 3,099,103 | 7/1963 | Wright | 248/188.8 |

FOREIGN PATENT DOCUMENTS

| | | | |
|---|---|---|---|
| 937,534 | 3/1948 | France | 248/357 |
| 1,038,453 | 8/1966 | United Kingdom | 248/357 |

*Primary Examiner*—Lawrence J. Staab
*Attorney, Agent, or Firm*—Leydig, Voit, Osann, Mayer & Holt, Ltd.

[57] ABSTRACT

An outrigger pad for placement between ground and the foot of an outrigger mechanism to support or level such outrigger mechanism that laterally stabilizes vehicular machinery and the like, wherein the pad which may be of one piece cast metal construction comprises a base having a generally planar lower surface, a second generally planar upper surface, the planes of the two surfaces defining an oblique angle with respect to one another, the lower planar surface having gripping means in the form of an annular array of concentric ribs adapted to penetrate the ground to restrict lateral movement and the upper surface has interfitting means in the form of a centrally located tubular member and a plurality of radially extending ribs with an annular array of notches in the upper surface ribs corresponding to the lower base surface ribs so that pads of the same construction may be stacked and rotated with respect to one another to vary the effective surface angle of the topmost one of such stacked pads.

14 Claims, 7 Drawing Figures

OUTRIGGER PAD

DESCRIPTION AND BACKGROUND OF THE INVENTION

The present invention relates generally to supporting and/or leveling of outrigger mechanisms that laterally stabilize vehicular machinery and the like, and more particularly to an outrigger pad system for placement between ground and the foot of an outrigger mechanism to improve the grade or slope angle at which the outrigger mechanism is supported.

Outrigger mechanisms are generally utilized to stabilize vehicular machinery with respect to reaction torques which are generated during use of the machinery, or that occurs because the machinery is stationed on or adjacent to a sloped surface. The outrigger mechanisms are extended from the vehicle on which the machinery is mounted outward and downward to the ground or other surface which surrounds the machinery, and the feet of each outrigger mechanism are planted on the ground. When the outrigger feet are firmly planted, the outrigger mechanisms prevent tipping, for example, by effectively increasing the supporting base width of the machinery.

In order for outrigger mechanisms to work effectively, however, the outrigger feet must be firmly planted on a supporting surface. Ideally the supporting surface should also resist deep ground penetration by the outrigger feet, and the supporting surface should be substantially perpendicular to the forces directed through the outrigger mechanism. When the forces are directed downward and away from the machinery as transmitted through the outrigger mechanisms to supporting surfaces under the conditions of actual use, a support surface which slopes upward as one moves away from the machinery is desirable. Conversely, a supporting surface which slopes downward as one moves away from the outrigger mechanism is undesirable, and the force directed through the outrigger mechanism meets the supporting surface at an acute angle that renders slipping more likely.

In the field, of course, a choice of ground working sites in which the surrounding area presents ideal support surface characteristics is not readily available. To successfully plant outrigger feet on the various types of sloping or uneven terrain and terrain that does not resist penetration, a means of improving the support surfaces is often necessary. Heretofore, wooden planks or pads have been used on a make-shift basis as a means of improving the outrigger feet support. The wooden planks or pads are in contact with a relatively large surface area of the support surface, thus relieving the pressure on the support surface and rendering penetration of the support surface by the outrigger foot less likely. When stacked in appropriate combinations, wooden planks and pads can be used to generate extensions of existing support surfaces that improve the angle of support for the outrigger mechanism. The method of using wooden planks has suffered, however, from the general disadvantages that accompany make-shift methods. It has been unreliable in that the proper angle of support can often not be obtained with the particular planks that are on hand. Often, even when the proper angle can be obtained, it can only be obtained by dangerous bridging. It has also been necessary under such make-shift method to carry into the field a supply of various sized planks, which are bulky, clumsy, and difficult to store.

SUMMARY OF THE INVENTION

It is primary aim of this invention to provide an outrigger pad or support and method of stabilizing outrigger mechanisms which systematically and reliably converts undesirable surfaces encountered in the field into support surfaces on which outrigger mechanism feet may be firmly planted.

Another object of the invention is to provide an outrigger pad which is strong and versatile, yet also relatively lightweight, easy to handle, and easy to store when not in use.

Yet another object of the invention is to provide an outrigger pad wherein only a small and definite number will provide the broad range of capabilities necessary for sloped and other ground surface irregularities.

A further object of the invention is to provide such an outrigger pad which will permit and better assure the electrical grounding of outrigged machinery.

Still another object of the invention is to provide such an outrigger pad which can be efficiently and economically manufactured.

DESCRIPTION OF THE DRAWINGS

Other objects and advantages will be apparent from the following detailed description and the accompanying drawings, in which.

Although the invention will be described in connection with a particular preferred embodiment, it will be understood that it is not intended to limit the invention to this particular embodiment. On the contrary, it is intended to cover all the various alternative and equivalent constructions included within the spirit and scope of the appended claims.

DETAILED DESCRIPTION OF PREFERRED EMBODIMENT

Figure 1:
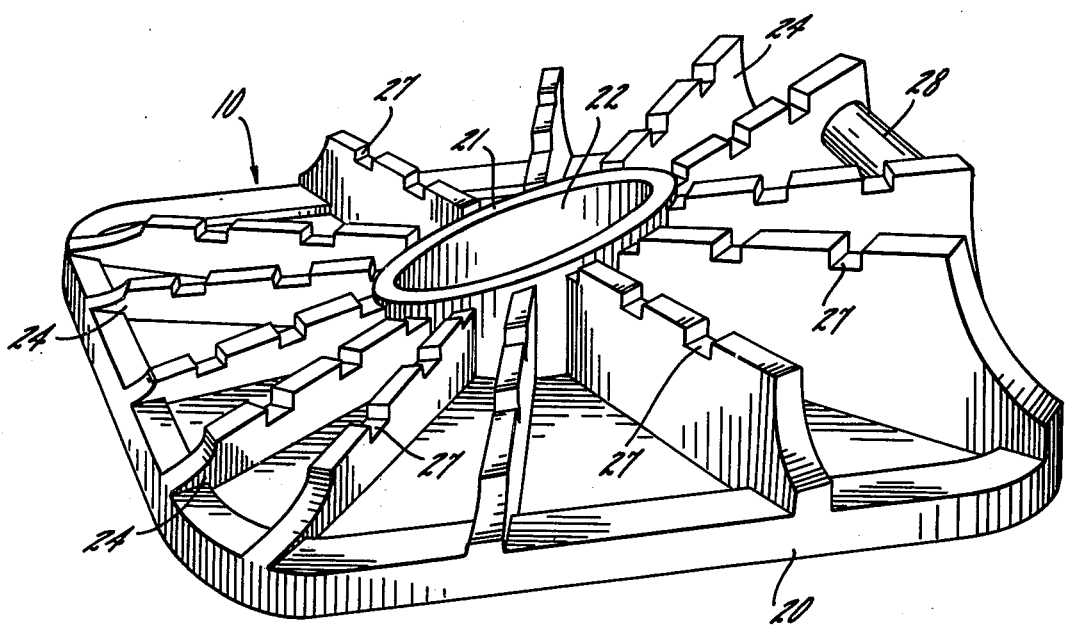
FIG. 1 is an enlarged perspective view of an outrigger pad in accordance with the present invention.

Turning now to the drawings, in FIG. 1 there is shown an outrigger pad according to the present invention, generally indicated at 10. The pad 10 which is here shown is generally rectangular in shape with rounded corners as viewed from the top or bottom and as viewed from a side the upper and lower surfaces of the pad are substantially planar, but disposed at an oblique angle to give the pad a wedge-shaped configuration.

Although the outrigger pad 10 may in its simplest form be of a solid construction, it is preferably constructed so as to minimize the amount of material used for its formation thereby keeping it as light and inexpensive as is consistent with the necessary strength requirements. Accordingly, in the preferred embodiment, the pad 10 includes a base plate 20 adapted for contact with the ground and defining the lower substantially planar surface. The upper substantially planar surface obliquely angled with respect to the lower surface is defined by the centrally located elliptical upward edge 21 of a tubular protrusion 22 that extends perpendicular from the base plate 20 and the upward edges 23 of a radially extending array of raised ribs 24 which extend upward from the base plate 20 and radiate from the tubular protrusion 22.

Figure 2A:
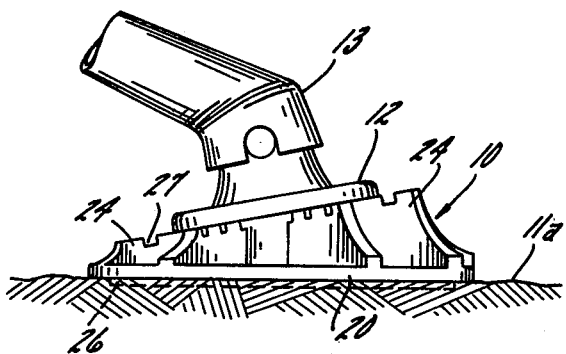
FIG. 2a is an elevational view on a reduced scale of the outrigger pad in FIG. 1 here shown as used separately on a level grade with a fragmentary end of an outrigger mechanism on the pad.

Referring to FIG. 2a, a pad 10 is shown as it would be placed between the ground 11a and a foot 12 which is pivotally mounted at the end of an outrigger mechanism 13. As illustrated in FIG. 2a, the ground 11a is substantially level so that the wedge shaped configuration of the pad 10 in this instance functions as a brace for the outrigger foot 12.

Figure 2B:
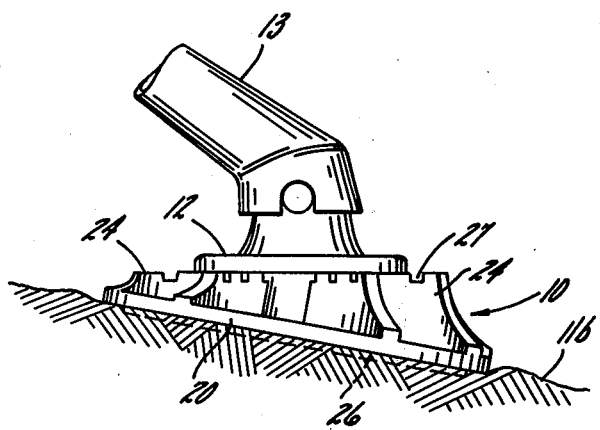
FIG. 2b is an elevation view of the outrigger pad in FIG. 2a as used separately on a first exemplary sloped grade.
Figure 4:
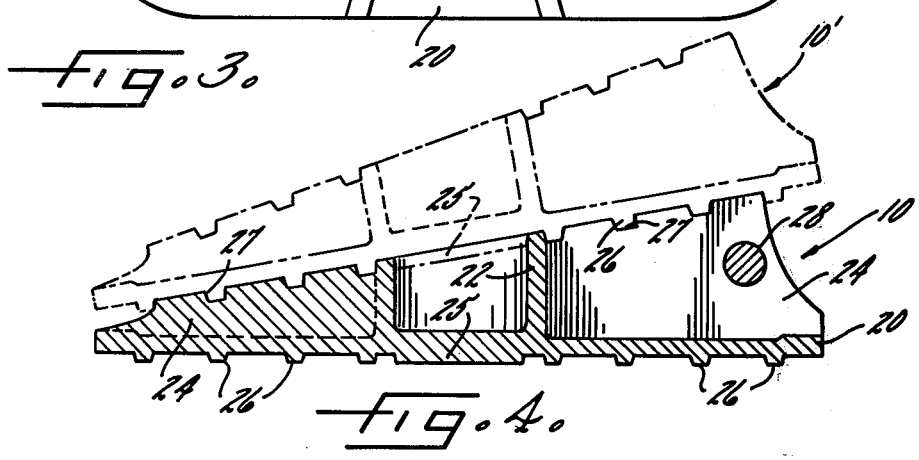
FIG. 4 is a vertical section of the outrigger pad in FIG. 1 along line 4—4 in FIG. 3 with a second pad in tandem shown by phantom lines.
Figure 5:
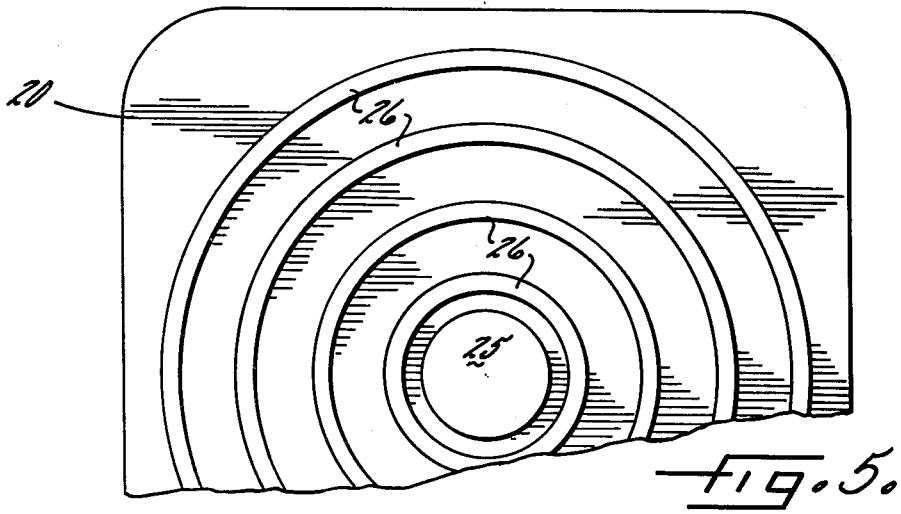
FIG. 5 is a partial bottom view of the outrigger pad in FIG. 1.

Referring to FIGS. 4 and 5, conjointly, the bottom surface of the base plate 20 of the outrigger pad 10 is provided with gripping means to prevent lateral slipping of the pad 10 on the ground when in use. To this end, the bottom of the base plate 20 includes a centrally located raised disk 25 which is surrounded by an array of concentric annular ribs 26. These gripping means are well adapted to partially penetrate into the ground, thus providing resistance to lateral movement of the base plate 20 over the ground 11a. It should be noted, however, that while the annular ribs 26 and the raised disk 25 are intended to penetrate into the ground, there is sufficient surface area in the pad base 20 itself to resist against undesirable sinking and the pad 10 gives firm support to the outrigger mechanism. With the angular upper surface of the pad 10, as viewed in FIG. 2b when the pad is situated on a sloped ground surface 11b, the pad 10 functions to provide a more level surface to receive the outrigger foot 12.

In accordance with another aspect of the invention, the base gripping means perform an additional function in connection with interfitting means on the upper surface of the pad that allows two like outrigger pads 10 to be stacked together.

Figure 2C:
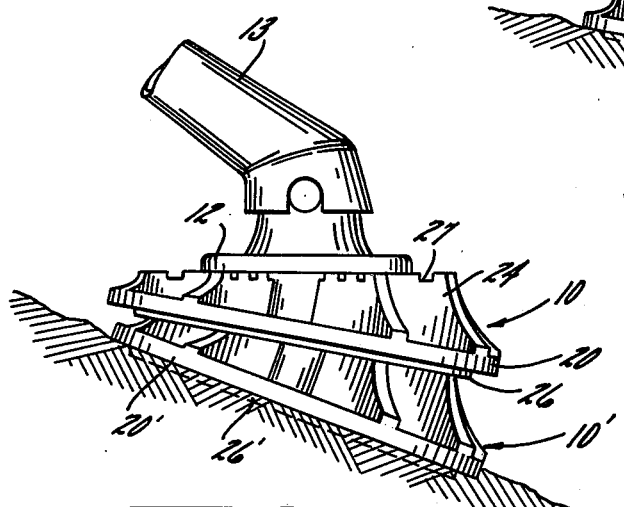
FIG. 2c is an elevation view of two outrigger pads like the ones in FIGS. 2a and 2b as used in tandem on a second exemplary sloped grade.
Figure 3:
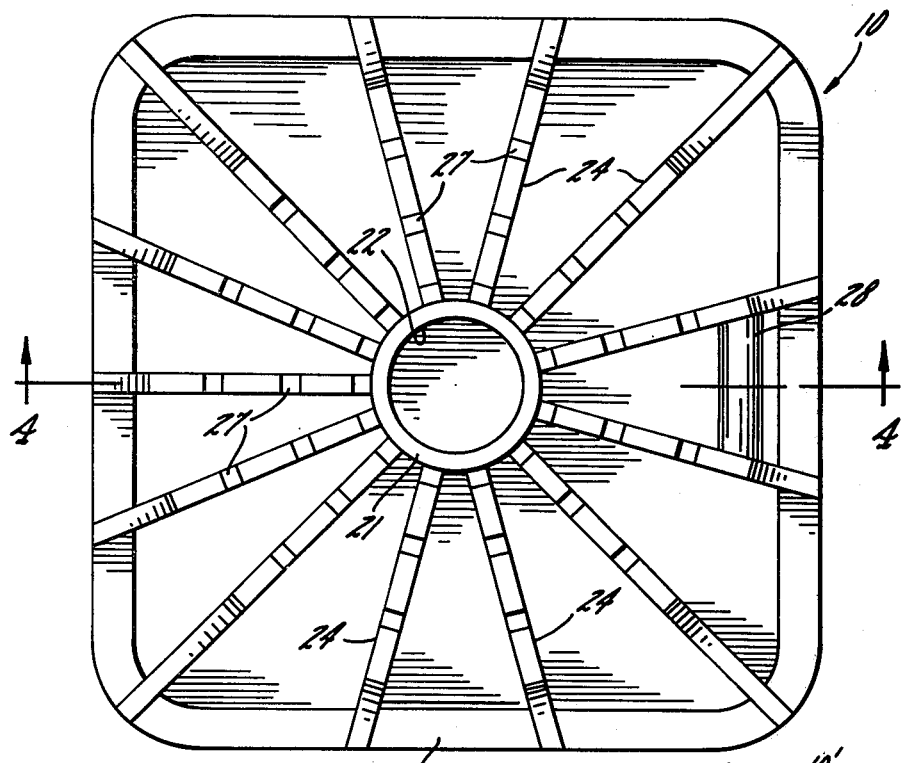
FIG. 3 is a top view of the outrigger pad in FIG. 1.

To this end, the annular ribs 26 on the bottom of the base plate 20 are positioned so as to cooperatively interfit with an array of annularly disposed notches 27 formed in the upward edges 23 of the ribs 24 on the upward surface of a like outrigger pad 10', as illustrated in FIGS. 2c and 4. Similarly, the raised disk 25 is cooperatively interfit with the tubular protrusion 22 on the upward surface. It may be noted that, in the illustrated embodiment, the disk 25 must be of slightly smaller diameter than the inner diameter of the tubular protrusion 22, as the disk 25 must be projected into the tub of a like outrigger pad at an angle that is less than 180° (by the oblique angle formed by the intersection of the two substantially planar surfaces of the outrigger pad 10).

The interfitting of the annular ribs 26 and the raised disk 25 of the outrigger pad 10 with the notches 27 and the tubular protrusion 22 of another like outrigger pad 10' permits two outrigger pads 10 to be stacked, and eliminates the possibility of one outrigger pad 10 slipping with respect to another when they are stacked.

The design of the interfitting ribs and notches in the preferred embodiment also permits rotation of an outrigger pad 10 with respect to another pad 10'. This feature makes it possible to generate wedges having any effective angle in the range of 0° to twice the angle of one outrigger pad 10 by simply rotational manipulation of one of the outrigger pads. Thus, the pads are highly versatile when stacked together, and yet allow for an effective surface angle adjustment to a wide range of particular conditions.

In the preferred embodiment, the pad 10 is of metal construction, and can be cast in one piece. The use of metal is advantageous in terms of strength, and it has an advantage over other materials in that it serves as a possible means to ground the machinery electrically. The outrigger pads are preferably cast of an aluminum magnesium alloy that combines strength with light weight. It is important to keep weight at a reasonable level, to allow ease of handling.

In order to facilitate ease of carrying the pad 10, a handle member 28 is integrally cast with the pad, extending between two ribs 24 on the side of the pad where the ribs extend the furthest from the base plate 20.

As can be seen from the foregoing detailed description of the illustrative embodiment, the outrigger pad of this invention provides a highly reliable, yet more precise replacement for make-shift stabilizing devices. When a minimum number of outrigger pads accompany a piece of machinery into the field, the operator may be sure that the means are at hand to support each outrigger mechanism at the most advantageous angle on a sloped or even level ground surface. Three outrigger pads for every pair of outrigger mechanisms has been found to be sufficient to cope with almost any situation that might be encountered. Thus, a fully equipped machine requires a minimum of storage space for auxiliary stabilizing equipment. The outrigger pads are not only more efficient and reliable than the previous make-shift methods, they are also safer. They eliminate bridging, and when made of a lightweight metal, as in the preferred embodiment, they permit electrical grounding. The outrigger pads can be manufactured economically as one piece castings.

It is claimed:

1. An outrigger pad for placement between an outrigger foot and the ground to improve the support given to an outrigger mechanism, said outrigger pad comprising:
    a base having a generally planar lower surface;
    gripping means on the lower surface of said base for penetrating the ground to a short distance when force is applied from above, thereby restricting lateral movement of the outrigger pad over the ground contacted by said gripping means;
    a plurality of raised ribs on the upper surface of said base, said ribs having upper edges lying substantially in a plane that defines an oblique angle with respect to the lower surface of said base;
    said ribs having interfitting means for receiving said gripping means on the lower surface of another outrigger pad of like construction, so that a plurality of outrigger pads of like construction can be interfittingly stacked, one on top of another, and restricted from lateral motion with respect to one another.

2. An outrigger pad in accordance with claim 1 wherein said gripping means comprises a plurality of raised rib means.

3. An outrigger pad in accordance with claim 2 wherein said interfitting means comprises an array of notches in the upper edges of said raised ribs that are adapted to receive the rib means of another outrigger pad of like construction.

4. An outrigger pad in accordance with claim 1 wherein said gripping means comprises an annular array of rib means.

5. An outrigger pad in accordance with claim 4 wherein said interfitting means comprises an annular array of notches in the upper edges of said raised ribs.

6. An outrigger pad in accordance with claim 1 wherein said raised ribs are radially arrayed on the upper surface of the outrigger pad.

7. An outrigger pad in accordance with claim 1 wherein handle means is disposed between at least a pair of said raised ribs on the upper surface of the outrigger pad.

8. An outrigger pad in accordance with claim 1 of one-piece cast metal construction.

9. An outrigger pad for placement between an outrigger foot and the ground to improve the support given to an outrigger mechanism, said outrigger pad comprising:
   a base having a generally planar lower surface;
   an annular array of rib means on the lower surface of said base, said ribs being adapted to penetrate the ground to a short distance when force is applied from above, thereby restricting lateral movement of the outrigger pad over the ground contacted by said rib means;
   a radial array of raised ribs on the upper surface of said base, the upper edges of said raised ribs lying substantially in a plane that defines an oblique angle with respect to the lower surface of said base;
   said raised ribs having an annular array of notches in their upper edges for receiving the rib means of another outrigger pad of the same construction, thereby permitting a first, top outrigger pad to be interfittingly stacked on a second, bottom outrigger pad, so that the outrigger pads so stacked are restricted from lateral motion with respect to one another.

10. An outrigger pad in accordance with claim 9 having a tubular member on the upper surface of said base, located at the center of said radial array of raised ribs.

11. An outrigger pad in accordance with claim 10 wherein handle means is disposed between at least a pair of said raised ribs.

12. An outrigger pad in accordance with claim 9 of one-piece cast metal construction.

13. An outrigger pad for placement between an outrigger foot and the ground to improve the support given to an outrigger mechanism, said outrigger pad comprising:
   a base having a generally planar lower surface;
   gripping means on the lower surface of said base for penetrating the ground to a short distance when force is applied from above, thereby restricting lateral movement of the outrigger pad over the ground contacted by said gripping means;
   a plurality of radially extending raised ribs on the upper surface of said base, said raised ribs having upper edges lying substantially in a plane that defines an oblique angle with respect to the lower surface of said base; and
   handle means disposed between at least a pair of said raised ribs.

14. An outrigger pad in accordance with claim 13 having a centrally located tubular member on the upper surface of said base.

* * * * *